June 12, 1962  D. DAYMON  3,038,463

SOLAR COOKER

Filed Dec. 22, 1958

INVENTOR.
DEALL DAYMON
BY
Murray J. Ellman

3,038,463
SOLAR COOKER
Deall Daymon, Levittown, Pa., assignor to Curtiss-Wright Corporation, a corporation of Delaware
Filed Dec. 22, 1958, Ser. No. 782,196
5 Claims. (Cl. 126—270)

This invention relates to a new and improved container.

More particularly, it is an object of this invention to provide a new and improved container or box which may be used, when opened and appropriately positioned in a field of incident radiation, for heating the contents thereof.

A second object of this invention is to provide a container wherein food may be packaged, shipped, stored, displayed, and sold, which container may also be used as a solar heater for cooking or heating food.

Another object of the present invention is to provide a container having the above advantages and which may be made economically enough to be used once or a very few times and then discarded.

The novel features which are considered as characteristic for the invention are set forth with particularity in the appended claims. The invention itself, however, both as to its construction and its method of operation, together with additional objects and advantages thereof, will be best understood from the following description of specific embodiments when read in connection with the accompanying drawings, in which:

Figure 1:
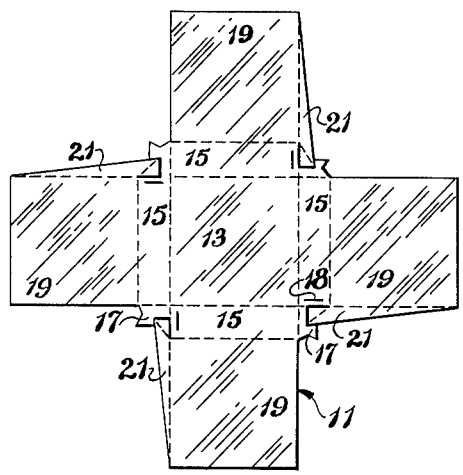
FIGURE 1 is a plan view of a blank for making a container embodying the principles of this invention.
Figure 2:
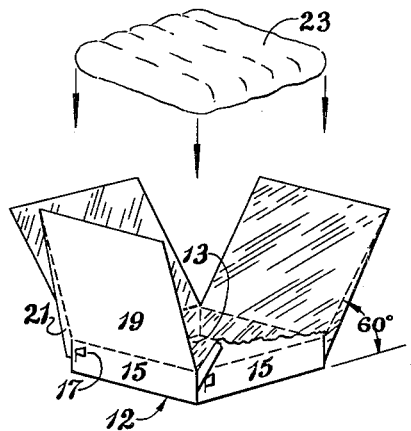
FIGURE 2 is a perspective view, partially broken away, of the container obtained from the blank of FIGURE 1, shown in the opened position.

Referring to the drawings, and more particularly to the embodiment illustrated in FIGURES 1 and 2, there is shown (in FIGURE 1) a blank 11 made from a reflective surfaced material, which is cut along the illustrated solid lines and which is foldable along the illustrated dashed lines.

As shown in FIGURE 2, when properly folded, the container 12 so produced, will have a bottom portion 13, side portions 15 held in position by interlockment of end portions 17 in respective cooperating slits 18, and top portions 19, which are approximately the same size and shape as the bottom 13, each having foldably attached thereto support flaps 21.

When the container 12 made from blank 11 is closed, each top portion 19 is folded down in the manner of a cover with its respective support flap 21 folded thereagainst in as compact a manner as possible. In this condition (i.e., closed), the container may be used for packaging, shipping, storing, displaying, and selling food.

When the container 12, made from blank 11, is opened and set up to heat or cook food contained therein, it presents the appearance approximately as illustrated in FIGURE 2 wherein each top portion 19 is maintained by its respective support flap 21 at a preselected position with respect to the bottom portion, 13, of the container. Preferably, the flaps 21 support their respective top portions 19 at an angle of approximately 60° to the plane of the bottom of the container.

The reasons for the preselected position will be explained more fully hereinbelow with respect to the embodiment illustrated in FIGURES 3, 4, and 5.

Referring to these figures, there is shown (in FIGURE 3) a blank 51 made from a reflective surfaced material, which is cut along the illustrated solid lines and which is foldable along the illustrated dashed lines. When properly folded, the container 52 so produced will have a bottom portion 53 and side portions 55 held in position by interlockment of end portions 57 in respective cooperating slits 58. In addition, it will have top portions 59, of approximately the same size and shape as the bottom portion 53, each having foldably attached thereto corner flaps 61 having interlockment means (end portions 62 or slits 64) thereon.

When the container 52, made from blnak 51, is closed, each top portion 59 is folded down in the manner of a cover with its corner flaps 61 folded inwardly. In this condition (i.e., closed), the container may be used for packaging, shipping, storing, displaying, and selling food.

Figure 4:
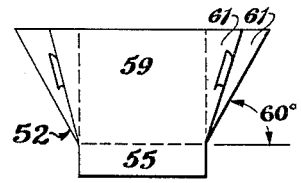
FIGURES 4 and 5 are respectively a side view and a plan view of the container obtained from the blank of FIGURE 3, shown in the opened position.
Figure 5:
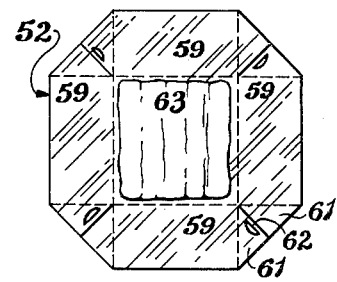

When the container 52, made from blank 51, is opened and set up to heat or cook food contained therein, it presents the appearance approximately as illustrated in FIGURES 4 and 5, wherein top portions 59 are maintained by interlockment of corner flaps 61, 61 in a preselected position with respect to the bottom portion, 53, of the container. Preferably, the flaps 21 support the top portions 59 at an angle which is approximately 60° to the plane of the bottom of the container.

When in use for heating food, the opened container 12 or 52 is positioned so that the plane of the bottom of the container is perpendicular to the sun's rays incident thereon. The food to be heated is placed within the container. Preferably, the food is wrapped in a single or double layer of transparent film 23, 63 which closely fits into the container 12 or 52 to most efficiently entrap the heat around the food.

If desired, thin material of high absorptivity may be interposed within the transparent film 23, 63 between the food and the incident radiation to increase the heat absorption and the temperature attained within the container.

When so set up and positioned for heating food, incident solar energy is reflected from the reflective surfaces of the opened portions 19 or 59, 61 into the food package 23, 63 thereby attaining, on sunny summer days, temperatures in the food package in excess of 200° F. without the use of any other source of heat.

Even on somewhat overcast days some useful heating will result, the amount of which is dependent upon the amount of sunlight available.

Figure 3:
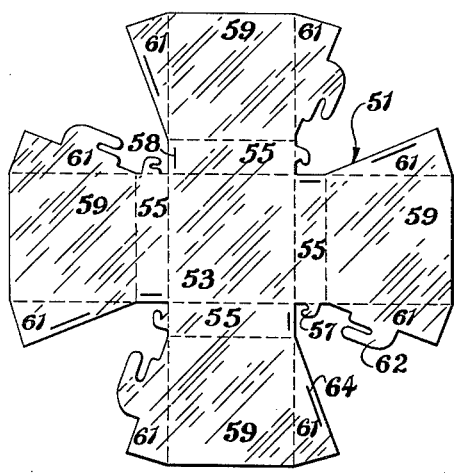
FIGURE 3 is a plan view of another blank for making an improved container embodying the principles of this invention.

The embodiment of FIGURES 3, 4, and 5 will produce a somewhat higher food temperature than will the embodiment of FIGURES 1 and 2 under the same conditions of incident radiation and ambient temperatures since the additional corner flaps 61 will provide additional concentration of incident radiation.

Without departing from the principles of the invention, the container may be made of any suitable material, such as cardboard, metal, plastic, etc., or mixtures of such materials. While the two embodiments have been described as cut from single blanks and assembled by interlockments, they could be made by any other known methods for fabricating containers of such materials, such as securing together plural parts separately fabricated. The reflective surfaces need be only on the portions exposed to incident radiation (such as portions 19, 59, and 61), and may be obtained by use of metal for these parts, metal foil laminated to a substrate having requisite structural strength and rigidity, metallizing the substrate, or use of highly reflective paints or other coatings, etc.

Further, the container need not be square as illustrated, but may be rectangular, triangular, hexagonal, pyramidal, or other shape as desired. While the illustrations show a 60° angle between the reflective surfaces and the plane of the bottom of the container, there is a certain limited range of useful angles within the range of about 50° to 70° with the angle of 60° being the optimum for the illustrated embodiments.

When the top portion 19 or 59 is made substantially the same size and shape as the bottom portion 13 or 53, substantially all the sunlight travelling in a beam perpendicular to the bottom of the container which impinges on the opened top portions will be reflected into the container body (or the food contained therein) when the top portions are situated at an angle of 60° to the plane of the container bottom (or at an angle of 30° to the path of the sunlight), and the reflective top portions will intercept a maximum amount of sunlight for their size.

With a smaller angle (say 50°) some of the sunlight impinging on the reflective top portions will not be reflected into the container body, thereby losing some of the radiant energy concentrating power of the container. With the still lower angle of 45°, substantially none of the sunlight impinging on the reflective top portions will enter the container body.

With a higher angle (say 70°), all of the sunlight will be reflected into the container body, but, since the reflective top portions will intercept less incident radiation, the radiant energy concentrating power of the container decreases. It is thus seen that 60° is the optimum angle, but that other angles are useable with efficiency (measured by maximum temperature obtainable or the time to heat a certain quantity of material to a predetermined temperature) decreasing as the angle departs from the optimum.

With other container shapes or other cover portion shapes, other angles may be optimum as may easily be calculated or determined graphically or experimentally.

These containers may be used for heating many divers foods, such as hot dogs, hamburgers, pizza pies, baked beans, etc., as well as liquids housed within suitable receptacles within the container.

It is expected that these containers will prove especially useful in areas where other forms of heating are unavailable, undesirable, or prohibited by law (such as at public beaches and parks which prohibit fires, and where a source of electricity is unavailable).

While the invention has been illustrated and described as embodied in a container for food, it can be used also for heating other materials of different sizes and shapes and it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications and modes of manufacture without omitting features that, from the standpoint of prior art, fairly constitute essential characteristics of the generic or specific aspects of this invention, and therefore, such adaptions should be and are intended to be comprehended within the meaning and range of equivalents of the following claims.

What is claimed as new and desired to be secured by Letters Patent is:

1. A foldable one-piece container and solar cooker for the packaging and heating of food comprising: a blank of material folded so as to form a bottom, sides and top covers, the undersides of said top covers each having a reflective surface; cooperating tabs and slots formed at the corners of said sides for retaining said blank of material in a folded position; and foldable support means integrally formed on said top covers for supporting said top covers in a position extending outwardly and upwardly at an angle between 50–70 degrees with the plane of said bottom when said container is open, whereby said top covers reflect solar energy incident thereon into said container when said container is exposed to solar energy.

2. A rectangular container and solar cooker for the packaging and heating of food which comprises: a blank of material having a reflective surface folded so as to form a bottom, four sides, and four top covers; said top covers being approximately the same size and shape as said bottom and having said reflective surface on the undersides thereof; cooperating tabs and slots formed at the corners of said sides for retaining said blank of material in a folded position whereby a closed container for packaging food is formed when said top covers are folded over said bottom; and an elongated, tapered and foldable support flap integrally formed on an edge of each of said top covers, said support flaps supporting said top covers in a position extending outwardly and upwardly at an angle of between 50–70 degrees with the plane of said bottom when said container is open and said support flaps are folded at an angle of substantially 90 degrees with said top covers, whereby said top covers reflect solar energy incident thereon into said container when said container is exposed to solar energy.

3. A foldable one-piece container and solar cooker for the packaging and heating of food which comprises a blank of material having a reflective surface folded so as to form a bottom, sides, and top covers; each of said top covers having said reflective surface on the underside thereof; cooperating tabs and slots formed at the corners of said sides for supporting said sides with respect to said bottom; foldable corner flaps integrally formed on opposite edges of said top covers; cooperating tabs and slots formed on adjacent foldable flaps on said top covers for supporting said top covers in a position extending outwardly and upwardly at an angle between 50–70 degrees with the plane of said bottom whereby said top covers and foldable flaps formed on said top covers reflect solar energy incident thereon into said container when said open container is exposed to solar energy.

4. A disposable, combination package and solar cooker which comprises a blank of material having a reflective surface folded so as to form a bottom, four sides, and four top covers, said top covers being of the same size and shape as said bottom and having said reflective surface on the undersides thereof; cooperating tabs and slots formed on the adjacent corners of said sides for supporting said sides with respect to said bottom; a foldable triangularly shaped corner flap formed on the opposite edges of each of said top covers, cooperating tabs and slots formed on and in respectively adjacent edges of said triangularly shaped corner flaps for supporting said top covers in a position extending outwardly and upwardly at an angle between 50–70 degrees with the plane of said bottom whereby said top covers and said corner flaps reflect solar energy incident thereon into said container when said open container is exposed to solar energy.

5. A foldable one-piece blank for forming a combination container and solar cooker for the packaging and heating of food comprising: a bottom portion, a plurality of side portions foldably hinged to said bottom portion; a tab formed on one edge of each of said side portions; a slot formed in an opposite edge of each of said sides, the tab formed on each side cooperating with the slot in an adjacent side to support said sides with respect to said bottom; a top portion foldably hinged to each of said sides, said top portions having a reflective surface on the underside thereof; and a foldable support flap formed on each of said top portions for supporting said top portions in a position extending outwardly and upwardly at an angle between 50-70 degrees with the plane of said bottom portion when said blank is formed into a container and said container is opened.

References Cited in the file of this patent

UNITED STATES PATENTS

| | | |
|---|---|---|
| 1,074,219 | Skiff | Sept. 30, 1913 |
| 1,677,654 | Pitts | July 17, 1928 |
| 2,386,062 | Roehrl | Oct. 2, 1945 |
| 2,595,905 | Telkes | May 6, 1952 |

OTHER REFERENCES

Parade article, Washington Post, April 18, 1954 (1 page article).